United States Patent
Jain et al.

(10) Patent No.: US 10,268,594 B2
(45) Date of Patent: Apr. 23, 2019

(54) IMPLEMENTING PAGING DEVICE SELECTION BASED ON WEAR-LEVEL DATA

(71) Applicant: International Business Machines Corporation, Armonk, NY (US)

(72) Inventors: Chethan Jain, Bangalore (IN); Maria R. Ward, Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 115 days.

(21) Appl. No.: 15/399,484

(22) Filed: Jan. 5, 2017

(65) Prior Publication Data

US 2018/0189189 A1 Jul. 5, 2018

(51) Int. Cl.
| | |
|---|---|
| G06F 12/00 | (2006.01) |
| G06F 12/1009 | (2016.01) |
| G06F 12/02 | (2006.01) |
| G06F 3/06 | (2006.01) |
| G06F 11/16 | (2006.01) |

(52) U.S. Cl.
CPC .......... G06F 12/1009 (2013.01); G06F 3/067 (2013.01); G06F 3/0616 (2013.01); G06F 3/0631 (2013.01); G06F 11/16 (2013.01); G06F 12/0284 (2013.01); G06F 2212/657 (2013.01); G06F 2212/7211 (2013.01)

(58) Field of Classification Search
CPC ............... G06F 12/1009; G06F 3/0653; G06F 12/0284; G06F 3/0665; G06F 3/0689; G06F 3/067; G06F 2212/657; G06F 2212/7211

USPC .................. 711/103; 714/704, 773
See application file for complete search history.

(56) References Cited

U.S. PATENT DOCUMENTS

| | | | |
|---|---|---|---|
| 7,216,196 B2 | 5/2007 | Jeddeloh | |
| 7,275,097 B2 | 9/2007 | Peak et al. | |
| 7,631,023 B1 | 12/2009 | Kaiser et al. | |
| 8,346,917 B2 | 1/2013 | Balasubramanian et al. | |
| 8,930,621 B2 | 1/2015 | Hiwatashi et al. | |
| 9,450,876 B1* | 9/2016 | Marr ..................... | H04L 47/125 |
| 2009/0249052 A1* | 10/2009 | Sareen ................ | G06F 12/0246 713/2 |
| 2013/0061101 A1* | 3/2013 | Fitzpatrick ........... | G11C 16/349 714/718 |
| 2013/0326148 A1* | 12/2013 | Fang ................... | G06F 12/0246 711/133 |
| 2015/0052300 A1* | 2/2015 | Piekarski .............. | G06F 3/0604 711/114 |

OTHER PUBLICATIONS

Chri et al., "Profiling Technique for Memory References within Individual Pages on Paging Based Virtual Memory Systems," IPCOM000109356D, IP.com, Aug. 1992.

(Continued)

*Primary Examiner* — Hong C Kim
(74) *Attorney, Agent, or Firm* — Joan Pennington

(57) ABSTRACT

A method, system and computer program product for implementing paging device selection based on wear-level factor data in a computer system. Paging is used to store the temporary memory pages in a virtualization environment. Wear-level factor data is identified for each paging device. Selection of a paging device is based on the identified wear-level factor data.

19 Claims, 9 Drawing Sheets

(56) References Cited

OTHER PUBLICATIONS

U.S. Appl. No. 14/994,910, filed Jan. 13, 2016, by Chethan Jain et al, and entitled "Managing Asset Placement Using a Set of Wear-Leveling Data".
U.S. Appl. No. 14/994,934, filed Jan. 13, 2016, by Chethan Jain et al, and entitled "Managing a Set of Wear-Leveling Data Using a Set of Bus Traffic".
U.S. Appl. No. 14/994,952, filed Jan. 13, 2016, by Chethan Jain et al, and entitled "Anaging a Set of Wear-Leveling Data Using a Set of Thread Events".

\* cited by examiner

200

| RESOURCE | NO. OF READS | NO. OF WRITES |
|---|---|---|
| PG_DISK 1, 160 | 1000 | 4000 |
| PG_DISK 2, 160 | 5000 | 2000 |
| PG_DISK 3, 160 | 3000 | 3000 |
| PG_DISK 4, 160 | 10 | 200 |

| CLIENT | TOTAL READS | TOTAL WRITES |
|---|---|---|
| CLI 1, 154 | 12000 | 2000 |
| CLI 2, 154 | 15000 | 20000 |
| CLI 3, 154 | 1000 | 2000 |
| CLI 4, 154 | 10000 | 10000 |

IMPLEMENTING PAGING DEVICE SELECTION BASED ON WEAR-LEVEL DATA

FIELD OF THE INVENTION

The present invention relates generally to the data processing field, and more particularly, relates to a method, system and computer program product for implementing paging device selection based on wear-level factor data.

DESCRIPTION OF THE RELATED ART

Hardware selection is a prime factor for performance considerations in a computing system. It is important for applications or system level features to choose the right resources to process work without any disruption.

In today's virtual computing environments, the practice of over-committing physical resources for better utilization of hardware is very common. One such example is memory over commitment. In this implementation, committed data is stored in the paging (swap) device area. A paging device provides a method of using a secondary storage device to allow programs to exceed their available physical memory capacity. Some examples of computing functions that make use of the paging device are partition mobility and partition hibernation.

In such implementations, it is important to select the right paging device for better performance and reliability. Reliability is very important to ensure data availability. Reliability can be directly dependent on the age of disk that is chosen as the secondary storage device for the temporary paging data since a disk that has been heavily used has a higher chance of failing.

A need exists for an effective mechanism to paging device selection. It is desirable to provide such mechanism that enables needed robustness without compromising Reliability, Availability, and Serviceability (RAS) features.

SUMMARY OF THE INVENTION

Principal aspects of the present invention are to provide a method, system and computer program product for implementing paging device selection based on wear-level factor data in a computer system. Other important aspects of the present invention are to provide such method, system and computer program product substantially without negative effects and that overcome many of the disadvantages of prior art arrangements.

In brief, a method, system and computer program product for implementing paging device selection based on wear-level factor data in a computer system. Paging is used to store the temporary memory pages in a virtualization environment. Wear-level factor data is identified for each paging device. Selection of a paging device is based on the identified wear-level factor data.

In accordance with features of the invention, the risk of hardware failure is reduced and the paging data is safe guarded.

In accordance with features of the invention, the performance in terms of hardware accessibility is increased by identifying the least utilized hardware to be used in the paging device selection.

In accordance with features of the invention, identifying wear-level factor data includes collecting read/write transaction data for each paging device.

BRIEF DESCRIPTION OF THE DRAWINGS

The present invention together with the above and other objects and advantages may best be understood from the following detailed description of the preferred embodiments of the invention illustrated in the drawings, wherein:

FIGS. 2A and 2B are diagrams illustrating respective example operations in the computer system and apparatus of FIGS. 1A and 1B in accordance with the preferred embodiment;

DETAILED DESCRIPTION OF THE PREFERRED EMBODIMENTS

In the following detailed description of embodiments of the invention, reference is made to the accompanying drawings, which illustrate example embodiments by which the invention may be practiced. It is to be understood that other embodiments may be utilized and structural changes may be made without departing from the scope of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In accordance with features of the invention, a method, system and computer program product for implementing paging device selection based on wear-level factor data in a computer system. An ideal method for assessing the age of a resource is by analyzing a wear leveling factor, rather than its actual age. The wear leveling factor is identified based on techniques used to prolong the service life of computer storage devices. Selecting a system paging device with a lower wear level factor indicates the system paging device has been less frequently used and is therefore less liable to fail based on utilization of the device.

Figure 1A:
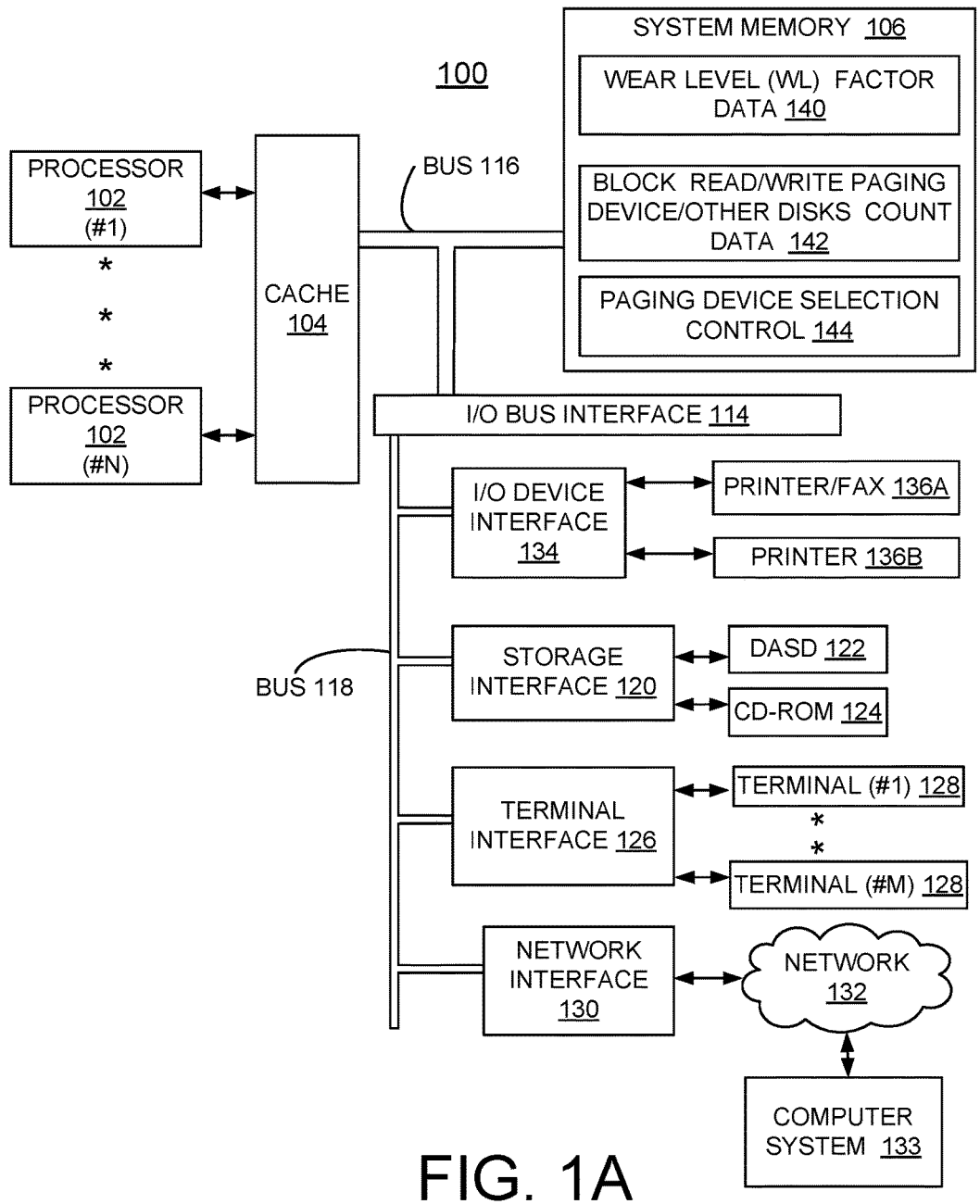
FIGS. 1A and 1B are block diagrams of an example computer system and apparatus for implementing paging device selection based on wear-level factor data in accordance with preferred embodiments.
Figure 1B:
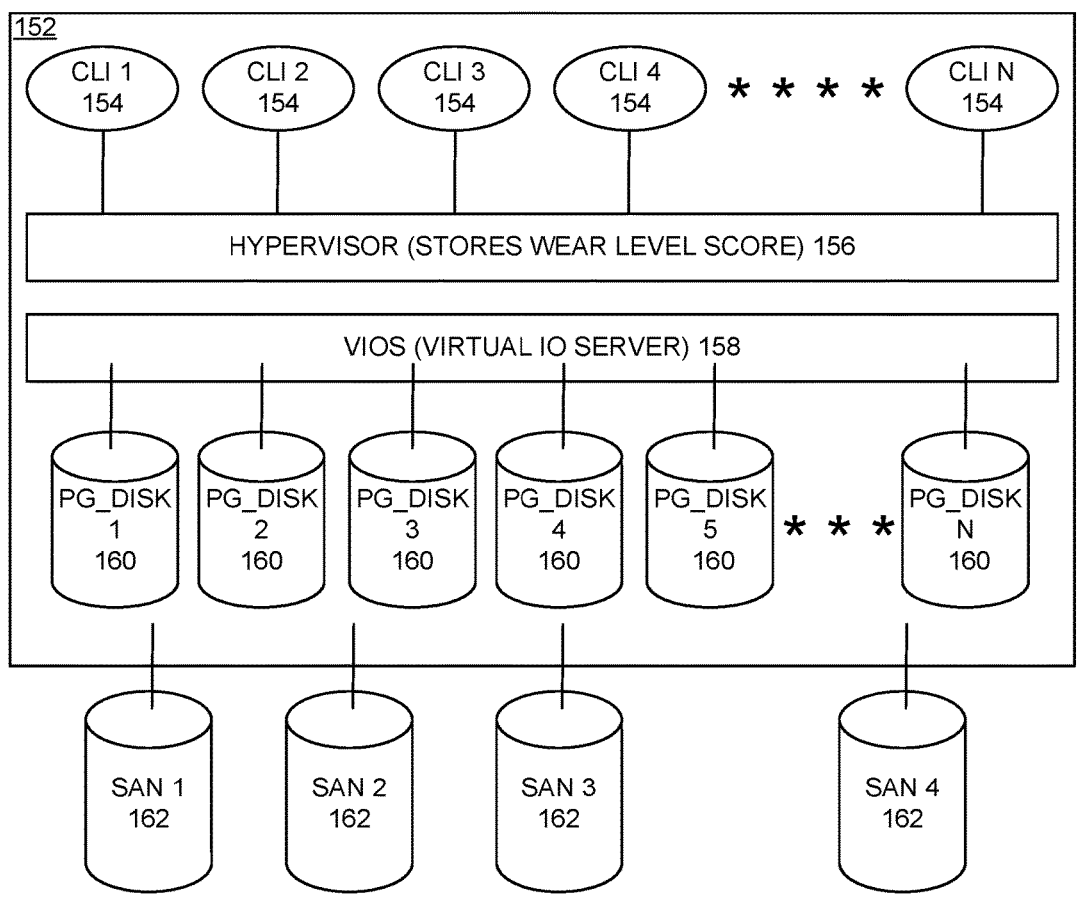

Having reference now to the drawings, in FIGS. 1A and 1B an example computer system and apparatus generally designated by the reference character 100 for implementing paging device selection based on wear-level factor data in accordance with the preferred embodiment. Computer system 100 includes one or more processors 102 or general-purpose programmable central processing units (CPUs) 102, #1-N. As shown, computer system 100 includes multiple processors 102 typical of a relatively large system; however, system 100 can include a single CPU 102. Computer system 100 includes a cache memory 104 connected to each processor 102.

Computer system 100 includes a system memory 106. System memory 106 is a random-access semiconductor memory for storing data, including programs. System memory 106 is comprised of, for example, a dynamic random access memory (DRAM), a synchronous direct random access memory (SDRAM), a current double data rate (DDRx) SDRAM, non-volatile memory, optical storage, and other storage devices.

I/O bus interface 114, and buses 116, 118 provide communication paths among the various system components. Bus 116 is a processor/memory bus, often referred to as front-side bus, providing a data communication path for transferring data among CPUs 102 and caches 104, system memory 106 and I/O bus interface unit 114. I/O bus interface 114 is further coupled to system I/O bus 118 for transferring data to and from various I/O units.

As shown, computer system 100 includes a storage interface 120 coupled to storage devices, such as, a direct access storage device (DASD) 122, and a CD-ROM 124. Computer system 100 includes a terminal interface 126 coupled to a plurality of terminals 128, #1-M, a network interface 130 coupled to a network 132, such as the Internet, local area or other networks, shown connected to another separate computer system 133, and a I/O device interface 134 coupled to I/O devices, such as a first printer/fax 136A, and a second printer 136B.

System memory 106 stores wear level (WL) factor data 140, block read/write paging device/other disks count data 142, and a paging device selection control 144 in accordance with the preferred embodiments.

Computer system 100 is shown in simplified form sufficient for understanding the present invention. The illustrated computer system 100 is not intended to imply architectural or functional limitations. The present invention can be used with various hardware implementations and systems and various other internal hardware devices.

As shown in FIG. 1B, computer system 100 includes a memory system 152 including a plurality of clients 154, CLI 1-N, a hypervisor 156 optionally storing a wear level factor of score 156, a VIOS (Virtual IO Server) 158, and a plurality of paging devices 160 PG-DISKS 1-N in accordance with the preferred embodiment. Memory system 152 is coupled to a plurality of storage area networks (SANs) 162, 1-4, as shown.

In accordance with features of the invention, a paging method optionally is provided at the level of hypervisor 156 with multiple paging disks 160, PG-DISKS 1-N on the virtual IO server 158 and multiple clients 154, CLI 1-N requiring paging devices. Assuming all the clients 154, CLI 1-N are performing some activity which requires the availability of a paging device, such as during Partition Hibernation, and Active Memory Sharing (AMS), and all are performing frequent paging activity. The hypervisor tracks and measures the Read/Write transactions occurring on each of the paging device transactions. Alternately, the VIOS 158 can also monitor the Read/Write transactions occurring on each of the paging device transactions and store the data at hypervisor level.

Referring to FIGS. 2A and 2B, there are shown example diagrams illustrating example collected transactions data generally designated by the reference character 200, 210 in the computer system 100 in accordance with the preferred embodiments. As shown in FIG. 2A, example collected transactions data 200 includes for resources 160, PG-DISKS 1-4 respective number of reads 1000, 5000, 3000, and 10 and writes of 4000, 2000, 3000, and 200. As shown in FIG. 2B, example collected transactions data 210 includes for clients 154, CLI 1-4 respective total reads 12000, 15000, 1000, and 10 and total writes of 2000, 20000, 2000, and 10000.

Figure 3A:
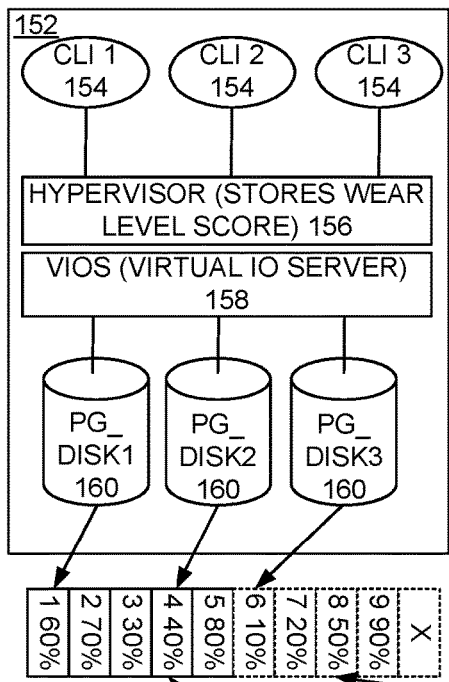
FIGS. 3A, 3B, and 3C are diagrams illustrating respective example operations in the computer system and apparatus of FIGS. 1A and 1B in accordance with the preferred embodiment.
Figure 3A:
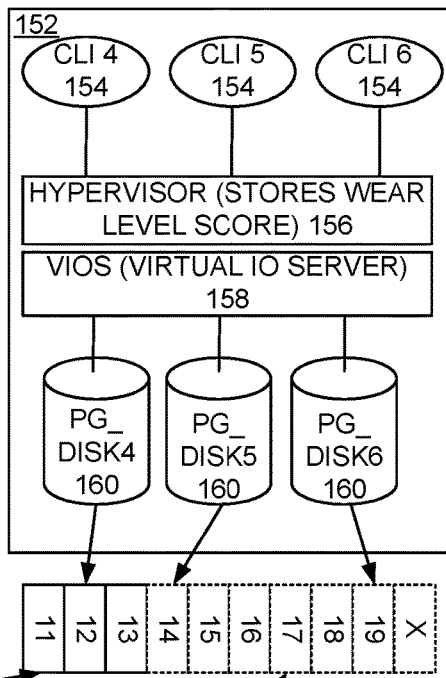
Figure 3A:
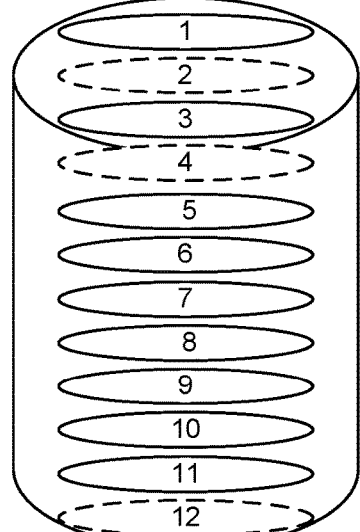
Figure 3A:
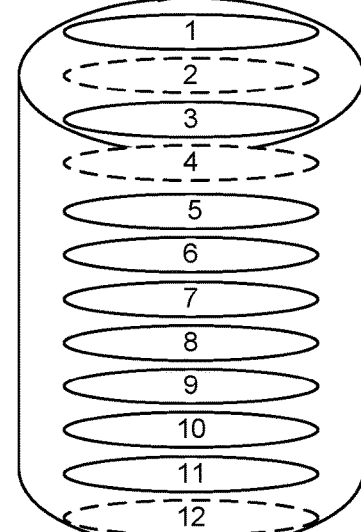
Figure 3B:
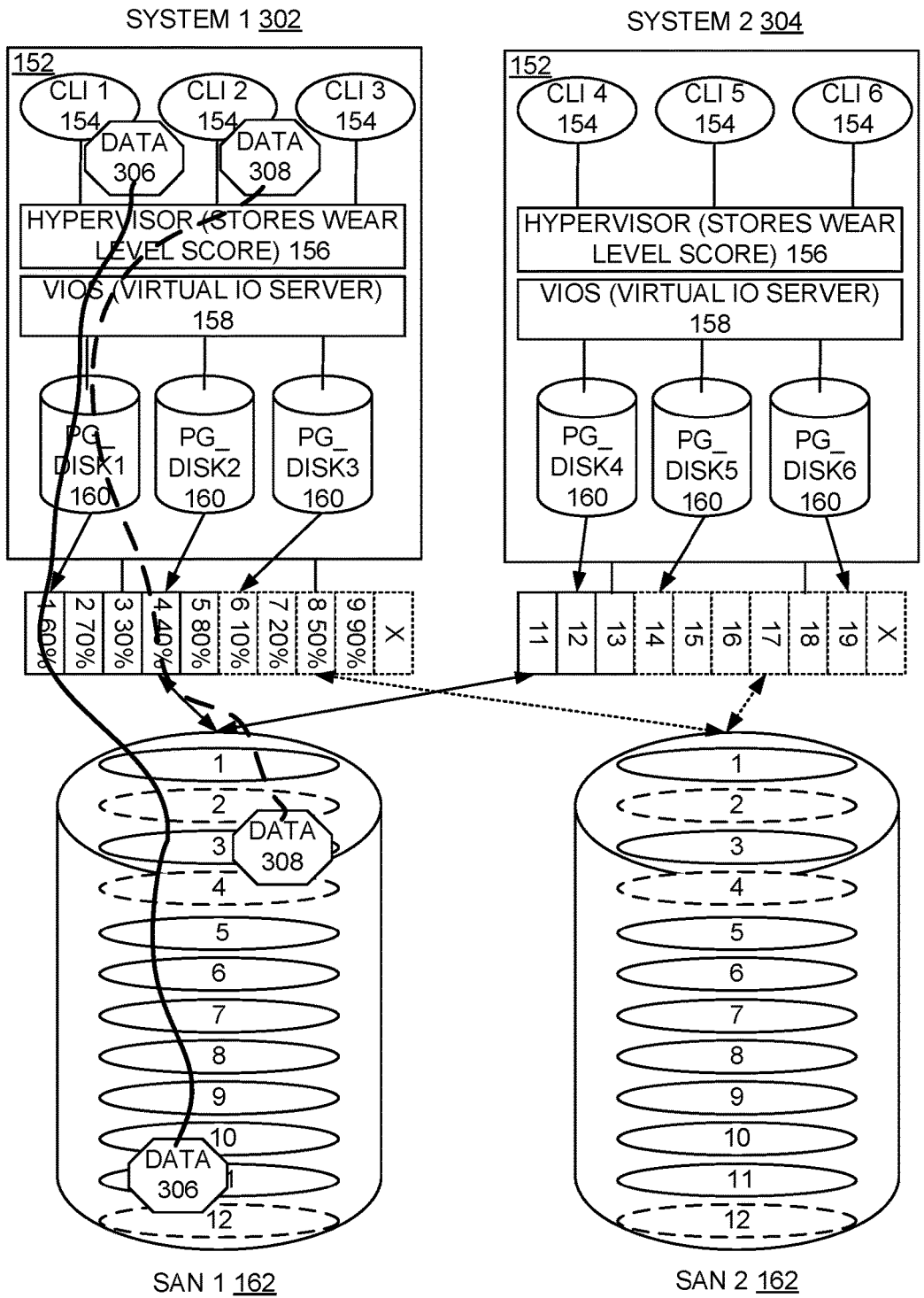
Figure 3C:
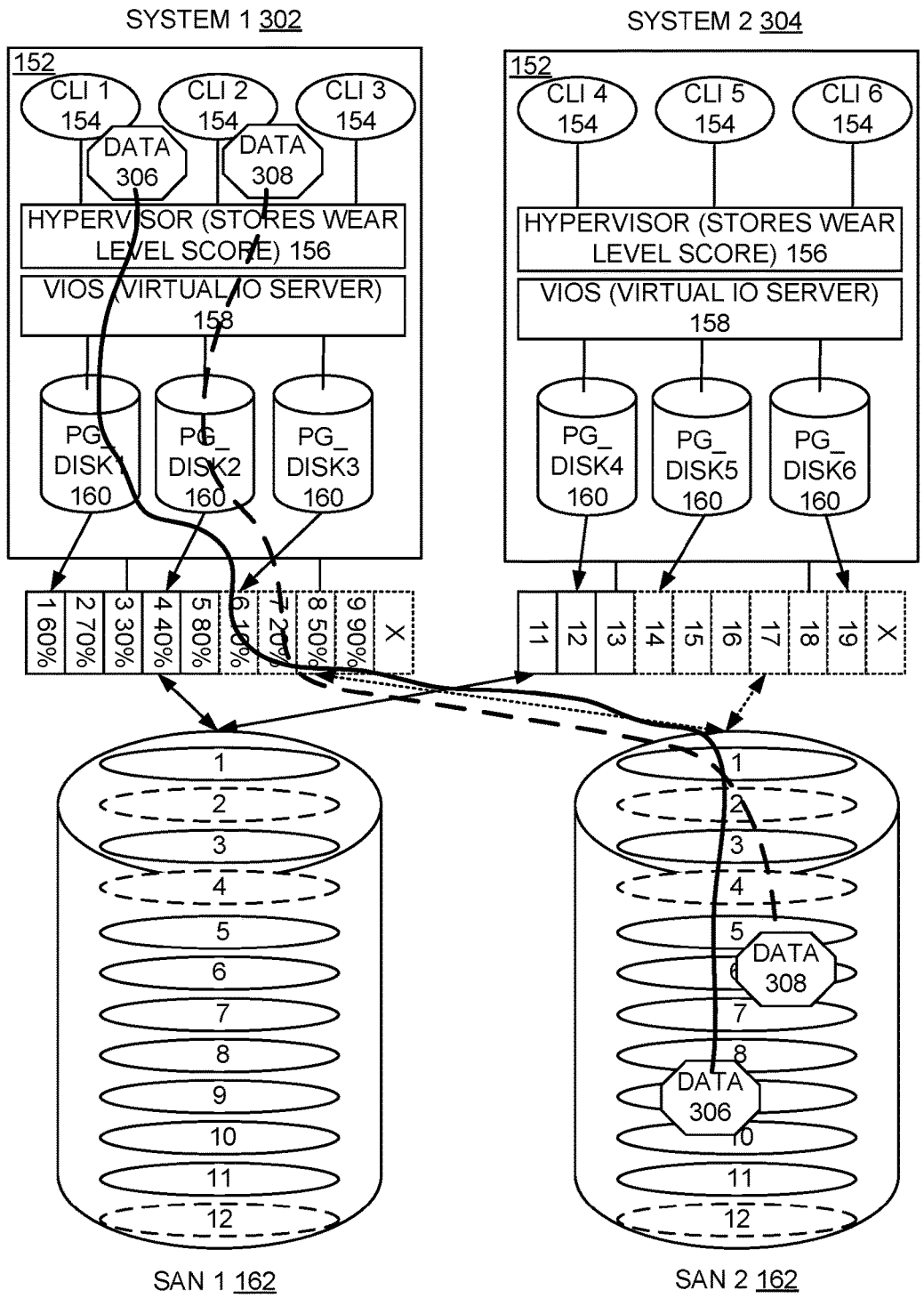

Referring to FIGS. 3A, 3B and 3C, there are shown diagrams illustrating respective example operations generally designated by respective reference character 300, 310, and 320 in computer system and apparatus 100 in accordance with a preferred embodiments. In FIGS. 3A, 3B and 3C, the example operations 300 start, for example, with I/O paging requests made by first by client 154, CLI 1 and then client 154, CLI 2 indicated by DATA 306 and 308 as shown in FIG. 3B in system 1 302. A wear level check is done at the physical disk layer by checking metadata from the respective disk. For example, each request is met with disks 3, and 11 indicated by DATA 306 and 308 that are least utilized from SAN 1, 162.

Actual Logical Unit Number (LUN) wear level utilization is not taken into consideration with conventional implementations. For example, LUNs 6 and 7 from SAN 2, 162 are the least used (10% and 20%), LUN to use, but this is not taken into consideration without the present invention. Disks 1, 3, 5-11 indicates less utilized physical disks, and Disks 2, 4, and 12 shown in dotted line are more heavily utilized in SAN 1, 162 and SAN 2, 162. For example, as shown in FIG. 3C the request is met with LUN 6, and 7 and disks 6 and 9 indicated by DATA 306 and 308 in SAN 2, 162 in system 2 302.

In accordance with features of the invention, a method implements enhanced paging device selection identifying the most suitable paging device based on the wear level factor of all of the available devices. A second level check, such as identifying whether the paging device size is greater than or equal to the VM maximum memory setting, optionally is utilized after the initial recommended device is selected via the wear level method of the invention.

Figure 4:
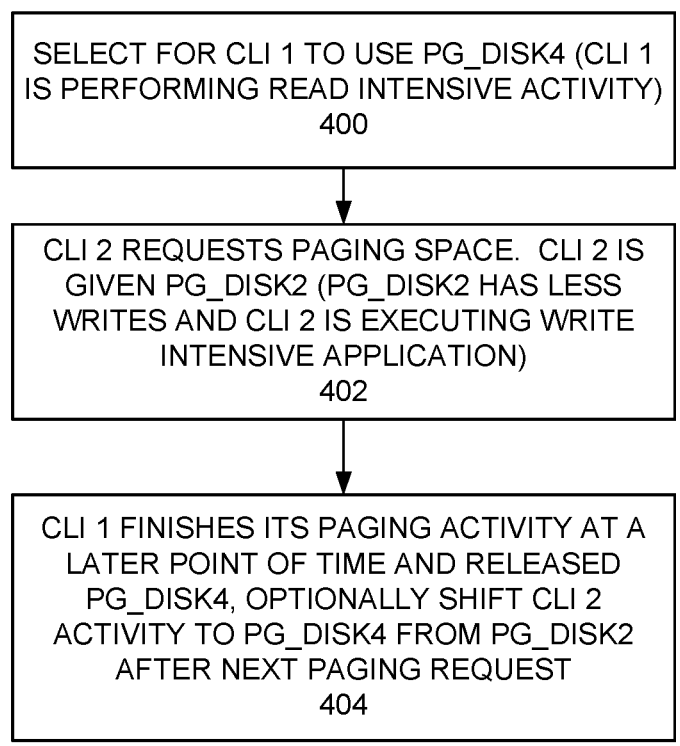
FIGS. 4 and 5 are flow charts illustrating example operations for implementing paging device selection based on wear-level factor data in the computer system and apparatus of FIGS. 1A and 1B in accordance with preferred embodiments.
Figure 5:
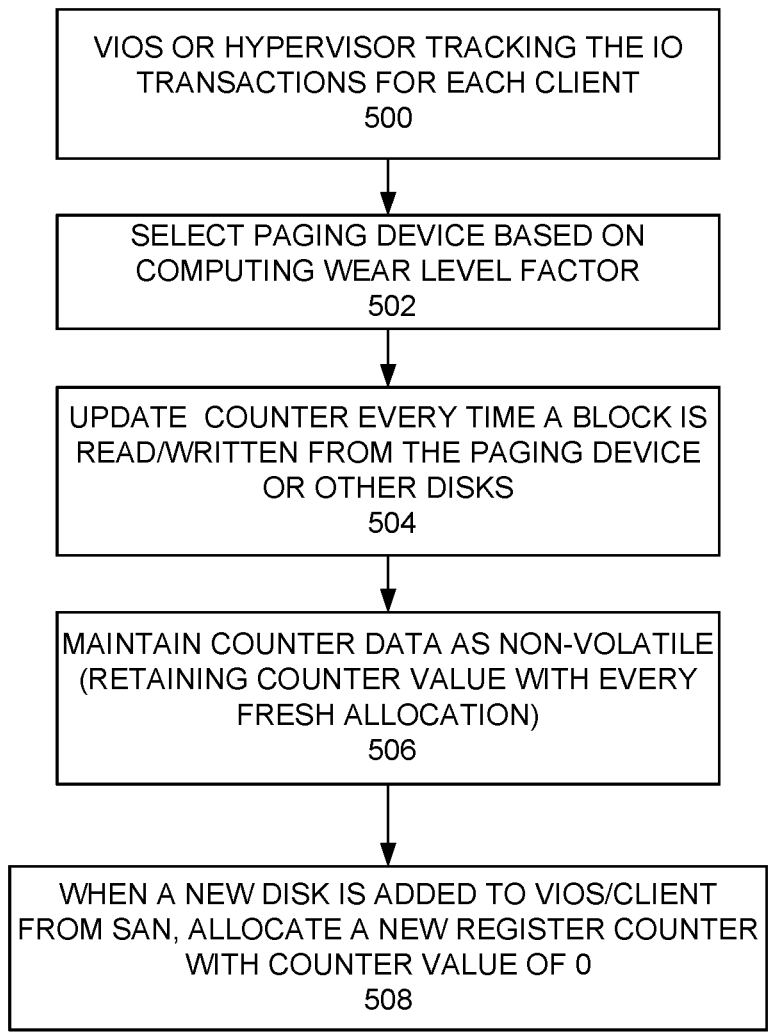

FIGS. 4 and 5 are flow charts illustrating example operations for implementing paging device selection based on wear-level factor data in the computer system and apparatus 100 of FIGS. 1A and 1B in accordance with preferred embodiments.

Referring now to FIG. 4, there are shown example operations for implementing enhanced paging device selection for CLI 1 selecting use of paging device PG_DISK4 is selected at a block 400 where CLI 1 is performing read intensive activity (total reads 12000 vs only 2000 writes) and PG_DISK4 has logged the least number of reads (10 reads). For example, at a block 402 CLI 2 requests paging space and is doing more write intensive activity (20000 writes vs 15000 reads). CLI 2 is given the next available best paging disk PG_DISK2 having less writes. Then for example, at a block 404 CLI 1 finishes its paging activity at a later point of time and released PG_DISK4, optionally activity of CL2 is shifted to PG_DISK4 from PG_DISK2 after the next paging request.

Referring now to FIG. 5, there are shown example operations for implementing enhanced paging device selection with the VIOS or hypervisor tracking the IO transactions for each client at a block 500. For example, at a block 502 a paging device is selected based on computing the wear level factor for each paging device. Then for example, at a block 504 a respective counter is updated every time a block is read/written from the paging device or other disks. At a block 506, counter data is maintained as non-volatile, where the counter value is retained with every fresh allocation.

When a new disk is added to the VIOS/Client from different storage devices in the in SAN, a new register counter is allocated with an initial counter value of 0 at a block 508.

Figure 6:
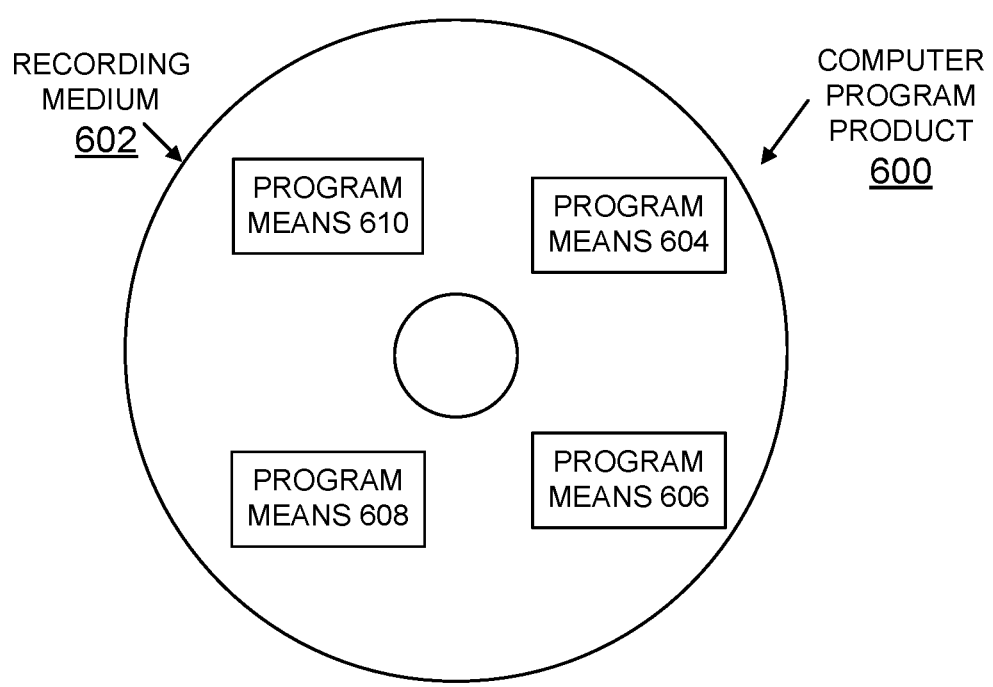
FIG. 6 is a block diagram illustrating a computer program product in accordance with the preferred embodiment.

Referring now to FIG. 6, an article of manufacture or a computer program product 600 of the invention is illustrated. The computer program product 600 is tangibly embodied on a non-transitory computer readable storage medium that includes a recording medium 602, such as, a floppy disk, a high capacity read only memory in the form of an optically read compact disk or CD-ROM, a tape, or another similar computer program product. Recording medium 602 stores program means 604, 606, 608, and 610 on the medium 602 for carrying out the methods for implementing enhanced paging device selection of the preferred embodiment in the computer system 100 of FIGS. 1A and 1B.

A sequence of program instructions or a logical assembly of one or more interrelated modules defined by the recorded program means 604, 606, 608, and 610, direct the memory system 100 for implementing enhanced paging device selection of the preferred embodiments.

While the present invention has been described with reference to the details of the embodiments of the invention shown in the drawing, these details are not intended to limit the scope of the invention as claimed in the appended claims.

What is claimed is:

1. A computer-implemented method for implementing paging device selection in a computer system comprising:
   providing a plurality of paging devices, using the plurality of paging devices to store temporary memory pages in a virtualization environment;
   identifying wear-level factor data for each paging device;
   selecting a paging device based on the identified wear-level factor data; and
   selecting a paging device based on (i) whether the paging device size is greater and or equal to a Virtual Machine (VM) maximum memory setting; (ii) paging device health and inactive paging devices; and (iii) a second level check once the initial recommended device is selected via a wear level algorithm.

2. The computer-implemented method as recited in claim 1 includes monitoring the plurality of paging devices to identify read/write transactions for each paging device.

3. The computer-implemented method as recited in claim 1 includes providing a respective register counter for each of the plurality of paging devices, said respective register counter storing read/write transactions for an associated paging device.

4. The computer-implemented method as recited in claim 3 includes maintaining counter data as non-volatile.

5. The computer-implemented method as recited in claim 1 includes maintaining wear level (WL) factor data for each of the plurality of paging devices.

6. The computer-implemented method as recited in claim 1 includes storing a respective number of read transaction and write transactions for each of the plurality of paging devices.

7. The computer-implemented method as recited in claim 1 includes using said stored respective number of read transaction and write transactions for each of the plurality of paging devices to identify a wear level (WL) factor for each of the plurality of paging devices.

8. The computer-implemented method as recited in claim 1 includes providing a hypervisor for maintaining a wear level (WL) factor for each of the plurality of paging devices.

9. A computer system for implementing paging device selection in a computer system comprising:
   a plurality of paging devices;
   a processor,
   a paging device selection control tangibly embodied in a non-transitory machine readable medium used to implement,
   said processor using said paging device selection control, using the paging devices to store temporary memory pages in a virtualization environment; identifying wear-level factor data for each paging device; and selecting a paging device based on the identified wear-level factor data including selecting a paging device based on (i) whether the paging device size is greater and or equal to a Virtual Machine (VM) maximum memory setting; (ii) paging device health and inactive paging devices; and (iii) a second level check once the initial recommended device is selected via a wear level algorithm.

10. The computer system as recited in claim 9 includes said processor using said paging device selection control to implement enhanced paging device selection for client requests.

11. The computer system as recited in claim 9 includes said processor using said paging device selection control monitoring the plurality of paging devices to identify read/write transactions for each paging device.

12. The computer system as recited in claim 9 includes a respective register counter for each of the plurality of paging devices, said respective register counter storing read/write transactions for an associated paging device.

13. The computer system as recited in claim 12 includes said counter data maintained as non-volatile.

14. The computer system as recited in claim 9 includes an additional allocated register counter for each new paging device, said allocated register counter having an initial counter value of 0.

15. The computer system as recited in claim 9 includes a hypervisor maintaining wear level (WL) factor data for each of the plurality of paging devices.

16. The computer system as recited in claim 9 includes a VIOS (Virtual IO Server) maintaining wear level (WL) factor data for each of the plurality of paging devices.

17. The computer system as recited in claim 9 includes a hypervisor storing a respective number of read transaction and write transactions for each of the plurality of paging devices.

18. The computer system as recited in claim 17 includes said hypervisor using said stored respective number of read transaction and write transactions for each of the plurality of paging devices to identify a wear level (WL) factor for each of the plurality of paging devices.

19. The computer system as recited in claim 9 includes a hypervisor monitoring the plurality of paging devices to identify read/write transactions for each paging device.

\* \* \* \* \*